UNITED STATES PATENT OFFICE.

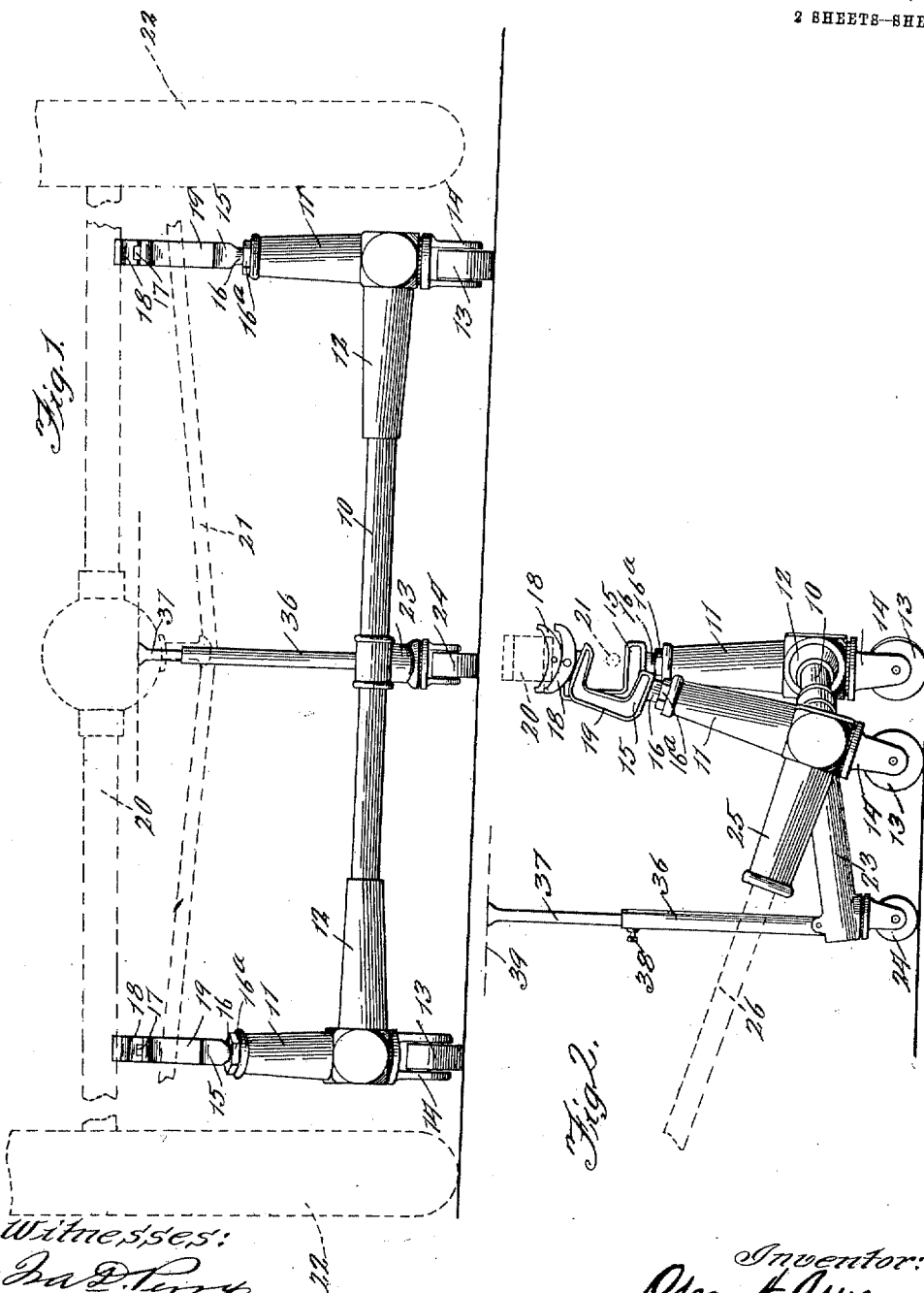

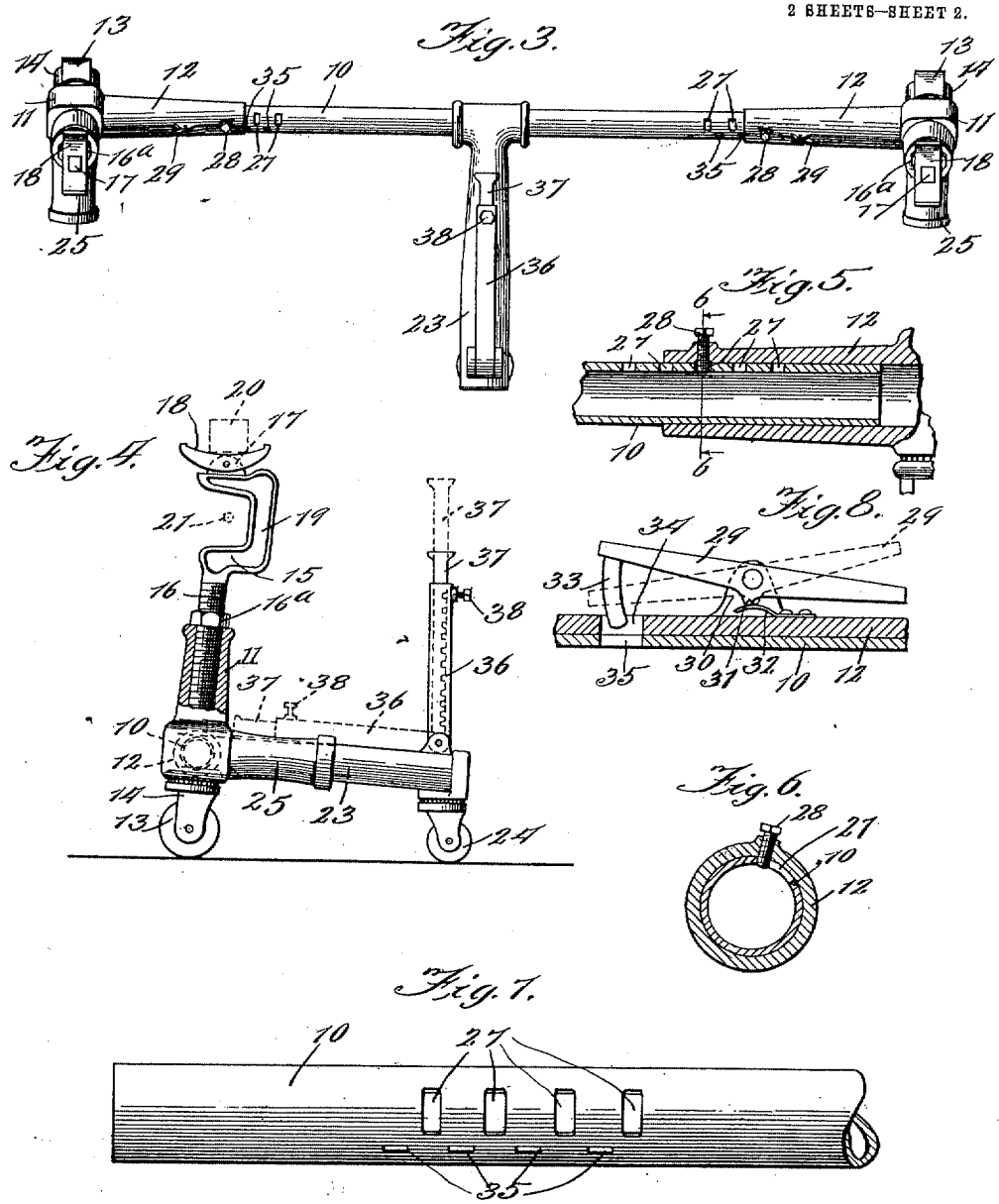

OSCAR H. AMES, OF COAL HILL, PENNSYLVANIA, ASSIGNOR OF ONE-HALF TO ROBERT McCALMONT, OF FRANKLIN, PENNSYLVANIA.

JACK-TRUCK.

983,418.  Specification of Letters Patent.  Patented Feb. 7, 1911.

Application filed March 21, 1910.  Serial No. 550,618.

*To all whom it may concern:*

Be it known that I, OSCAR H. AMES, a citizen of the United States, residing at Coal Hill, in the county of Venango and State of Pennsylvania, have invented certain new and useful Improvements in Jack-Trucks, of which the following is a specification.

My invention relates to a jack truck, that is to say, to a jack which can be used as means for transporting as well as raising from the ground the vehicle or other device or object under which it is placed, an appliance of this character being shown and described in my application filed November 5, 1909, Serial No. 526,397; and the object of the invention is to provide certain new and improved constructions and arrangements in devices of the character above mentioned.

One of the principal objects of the invention is to provide a novel construction of jack truck, suitable especially for heavy vehicles, such as large automobiles for example, which is applied to both ends of the axle of the automobile or other vehicle but is operated so as to raise the ends of the axle separately. An appliance of this character is shown in my pending application above mentioned but is not specifically claimed therein.

The invention has for further objects the several novel arrangements, constructions and devices relating to jacks and particularly to jacks which can be used also as trucks, which will be hereinafter described and claimed.

Obviously, the device of my invention could be used simply as a jack, that is, as a means for raising an automobile or other vehicle, without any use being made of the truck feature, in which case certain parts of the device, as will be apparent, could be omitted.

The device in a preferred embodiment is shown in the accompanying drawings, wherein—

Figure 1 is a front elevation of the jack truck, being shown as applied to the rear axle of an automobile; Fig. 2 is a side elevation of the device showing the parts in the same relative positions; Fig. 3 is a plan view; Fig. 4 a side elevation with parts in section; Fig. 5 a fragmentary section taken through the joint between one of the rocking members and the cross piece on which the same is sustained, being on line 5—5 of Fig. 6; Fig. 6 is a cross section taken on line 6—6 of Fig. 5; Fig. 7 is a fragmentary view of the cross piece and Fig. 8 a sectional view illustrating a preferred form of locking device employed to lock the rocking members to the cross piece.

Like characters of reference indicate like parts in the several figures of the drawings.

Referring to the drawings, 10 designates a tubular cross piece, on the opposite ends of which are rotatably mounted the standards or rocking members 11, the latter being provided with horizontal sleeves 12 which telescope with the ends of the cross piece 10. The lower ends of the standards 11 are furnished with wheels or rollers 13, preferably mounted in brackets 14 which are swiveled in the ends of the standards 11. That is, the standards are preferably provided with casters, this being in view particularly of the use of the device as a truck. At the upper ends of the standards are the axle supports 15 which by preference are adjustably mounted on the standards, the axle supports for example, being formed with threaded stems 16 extending into threaded openings in the standards, the adjustment being maintained by jam nuts 16$^a$. Preferably, the axle supports are formed on top with the lugs 17, on which are pivotally mounted the pillows 18. If the jack is to be used on an axle having a truss rod, the axle supports are formed with the offsets 19 so as not to interfere with such truss rod.

The axle of the automobile or other vehicle is designated in the drawings by numeral 20, the truss rod by 21 and the wheels by 22. Extending back from the cross piece 10 is a sustaining member 23 provided preferably with the caster 24.

The standards 11 are formed with sockets 25 adapted to receive the end of the removable lever 26, by means of which the rocking portions of the jack may be moved to their supporting positions. This is a preferred construction, as it shortens and lightens the device. It is obvious, however, that the rocking members or portions of the jack might be supplied with any other form of lever.

In order to accommodate the appliance to vehicles of different widths, adjustment is provided as between the sleeves 12 and cross piece 10, the cross piece being formed at each end with a plurality of slots 27 which are adapted to receive the ends of the set-screws 28 threaded through the sleeves 12.

Preferably, the device is provided with means for locking the rocking members in their operative positions. Suitable means for accomplishing this result is shown particularly in Figs. 3 and 8. A lever 29 is mounted between lugs 30 on the sleeve 12, this lever being formed under its pivotal point with a nose 31 which bears against a spring 32 secured to the sleeve. At one end the lever carries a pivot pin 33 which is adapted to extend through a slot 34 in the sleeve 12 and through a slot 35 in the cross piece 10. Obviously, the lever is held in either position by the spring and may be operated with the foot.

In order to steady the load when the jack is used as a truck, an extensible rod is provided which can be adjusted so as to bear against the under side of the vehicle. I have shown this device as consisting of a tubular member 36 pivoted to the outer end of the sustaining member 23, and of a rod 37 which telescopes within the member 36 and which can be held at any desired extended position by means of the set-screw 38 or other suitable means. The surface against which the rod 37 bears is indicated at 39 in Fig. 2.

It will be understood that my invention might be embodied in structures mechanically different from the appliance shown and described. I therefore do not limit myself to the several devices, constructions, arrangements and proportion of parts shown, except so far as these particulars are made limitations on certain of the claims herein.

The operation of the device, as above described, is as follows: It will be understood that the jacks of my invention are intended ordinarily to be used in pairs, one for the front axle of the automobile and one for the rear axle. Supposing the jack shown in the drawings to be used on the rear axle, it will be placed against such axle from the rear of the machine with the standards 11 both inclined backwardly with respect to the axle. The lever 26 is then inserted in one of the sockets 25 and the rocking or supporting member on one side of the jack rocked to the position of the more remote of these members, as shown in Fig. 2, the roller 13 moving forward along the floor or ground during such rocking operation. The lever 26 is then removed from the socket on this side of the machine and is placed in the socket on the other side of the machine and the other standard or rocking member turned to its operative or lifting position. It will be seen that by providing the rocking members with casters, which preferably is done, the jack can easily shift to the several positions which it has to take successively in being applied to the axle. The application of the device to the axle is facilitated by constructing the axle supports with the rocking or pivoted pillows 18, as in such case the change in the angular position of the supports does not necessitate any shifting of the axle with respect to the pillow which immediately supports the same. When the device is to be used as a truck in connection with a similar appliance on the other axle, the load may be steadied by extending the rod 37 until it bears against the under side of the vehicle. It will be seen that when in supporting position the standards 11 are slanted backwardly a trifle. This brings the axle effectively between the rollers 13, 13 and roller 24, giving the jack stability.

While my preferred construction of jack employs all of the features shown and described, it is obvious that certain of these structural details might, if desired, be omitted and that likewise such subsidiary devices might be used in the construction of jacks different from the jack shown.

I claim:

1. An appliance of the character described comprising, in combination, a supporting member provided with means which bears upon the ground, a rigid rocking member which is pivoted at a fixed point to the supporting member and is provided at its upper end with means for engaging a vehicle axle, and at its lower end with a roller which bears against and rolls over the ground when said member is rocked, and also with a lever by means of which said member is rocked.

2. An appliance of the character described comprising in combination a cross piece, rocking members which are independently revoluble on said cross piece, the upper ends of which are adapted to engage the device to be raised and the lower ends of which are provided with rollers, and means on said rocking members comprising a lever whereby the same may be separately turned on said cross piece so as to raise said device.

3. An appliance of the character described comprising in combination a cross piece, rocking members independently revoluble on said cross piece, the upper ends of which are adapted to engage the device to be raised and the lower ends of which are provided with rollers, and means on said rocking members comprising a lever whereby the same may be separately turned on said cross piece to raise said device; said rocking members being adjustable on said cross piece so as to vary the effective width of said appliance.

4. An appliance of the character described comprising in combination a cross piece, rocking members independently revoluble on said cross piece, the upper ends of which are adapted to engage the device to be supported and the lower ends of which are provided with rollers, means on said rocking member comprising a lever whereby the same may be separately turned on said cross piece to raise said device, and a sustaining member connected with said cross piece.

5. An appliance of the character described comprising in combination a cross piece, rocking members independently revoluble on said cross piece, the upper ends of which are adapted to engage the device to be supported and the lower ends of which are provided with rollers, means on said rocking member comprising a lever whereby the same may be separately turned on said cross piece to raise said device, a sustaining member connected with said cross piece, and a roller on said sustaining member.

6. An appliance of the character described comprising in combination a cross piece, rocking members which are independently revoluble on said cross piece, the upper ends of which are adapted to engage the device to be raised and the lower ends of which are provided with rollers, means on said rocking members comprising a lever whereby the same may be separately turned on said cross piece so as to raise said device, and means for locking said rocking members to said cross piece for the purpose described.

7. An appliance of the character described comprising in combination a cross piece, a sustaining member projecting from said cross piece, and rocking members independently revoluble on opposite ends of said cross piece, the upper ends of which are adapted to engage the opposite ends of a vehicle axle and the lower ends of which are provided with rollers; said rocking members being formed with sockets for a lever whereby the said rocking members may be separately turned on said cross piece so as to raise the ends of said axle.

8. An appliance for separately raising opposite ends of a vehicle axle comprising supporting means provided with means adapted to bear against the ground, two rocking members pivoted to the supporting means and having independent rocking movement, each of said members provided at its upper end with means for engaging the vehicle axle and at its lower end with a roller which bears upon the ground, and with means comprising a lever whereby it may be rocked so as to raise the end of the axle which it engages.

9. An appliance for separately raising opposite ends of a vehicle axle comprising two rocking members having independent rocking movement, each of said members provided at its upper end with a pivotally mounted pillow which sustains the vehicle axle and at its lower end with a roller which bears upon the ground, and with means comprising a lever whereby it may be rocked so as to raise the end of the axle against which it is placed.

10. An appliance for separately raising opposite ends of a vehicle axle comprising two rocking members having independent rocking movement each of said members provided at its upper end with means for engaging the vehicle axle and at its lower end with a roller which bears upon the ground, and with means comprising a lever whereby it may be rocked so as to raise the end of the axle which it engages, and means for locking said rocking members in their operative positions.

11. An appliance of the character described comprising in combination a cross piece, two rocking members pivotally mounted thereon so as to be capable of rocking independently, and means comprising a lever for separately rocking the same to their lifting positions; said rocking members being adjustably mounted on the cross piece so that the distance between the same may be varied.

12. An appliance of the character described comprising in combination a cross piece, a pair of standards rotatably mounted thereon, axle supports on said standards, rollers on said standards, a longitudinal member connected with said cross piece, and means on said standards comprising a lever whereby said standards may be separately rocked.

13. An appliance of the character described comprising in combination a cross piece, a pair of standards rotatably mounted thereon, axle supports adjustably mounted on said standards, rollers on said standards, a longitudinal member connected with said cross piece, and means on said standards comprising a lever whereby said standards may be separately rocked.

14. An appliance of the character described comprising in combination a cross piece, a pair of standards rotatably mounted thereon, axle supports on the standards provided with rocking bearings, rollers on the standards, a longitudinal member connected with said cross piece, and means on said standards comprising a lever whereby said standards may be separately rocked.

15. An appliance of the character described comprising in combination a cross piece, a pair of standards rotatably mounted thereon, axle supports on the standards, rollers on said standards, a longitudinal member connected with the cross piece, a roller on the same, and means on said standards comprising a lever whereby said standards may be separately rocked.

16. An appliance of the character described comprising in combination a cross piece, a pair of standards rotatably mounted thereon, axle supports on said standards, rollers on said standards, a longitudinal member connected with said cross piece, means on said standards comprising a lever whereby said standards may be separately rocked, and means for locking said standards to said cross piece.

17. An appliance of the character described comprising in combination a cross piece, a pair of standards rotatably mounted thereon, axle supports on said standards, rollers on said standards, a longitudinal member connected with said cross piece, means on said standards comprising a lever whereby said standards may be separately rocked, and an extensible support connected with said longitudinal member for the purpose described.

18. An appliance of the character described comprising in combination a cross piece, a pair of standards rotatably mounted thereon, axle supports on said standards, rollers on said standards, a longitudinal member connected with said cross piece, and means on said standards comprising a lever whereby said standards may be separately rocked, said standards being adjustably mounted on the cross piece so that the distance between the same may be varied.

19. An appliance of the character described comprising in combination a cross piece, a pair of standards rotatably mounted thereon, rollers on the standards, a longitudinal member connected with the cross piece, means on said standards comprising a lever whereby said standards may be separately rocked, and axle supports on said standards which are effectively between the rollers on the standards and the roller on the longitudinal member when the device is in supporting position.

20. An appliance of the character described comprising in combination a cross piece, a pair of standards rotatably mounted thereon, means whereby the distance between the standards may be varied, axle supports adjustably mounted on said standards and provided with rocking pillows, a longitudinal member connected with the cross piece, casters on said standards, and on said longitudinal member, means for locking the standards to said cross piece, an extensible support connected with said longitudinal member, a lever, and means on said standards adapted to be engaged by said lever.

21. An appliance of the character described comprising in combination a cross piece, a pair of standards rotatably mounted thereon, means whereby the distance between the standards may be varied, axle supports mounted on said standards and provided with rocking pillows, a longitudinal member connected with the cross piece, rollers on said standards and on said longitudinal member, means for locking the standards to the cross piece, and means on said standards adapted to be engaged by a lever for the purpose described.

OSCAR H. AMES.

Witnesses:
CHAS. E. SHOUP,
ROBERT N. SPEER.